(12) United States Patent
Shimozawa et al.

(10) Patent No.: US 7,466,363 B2
(45) Date of Patent: Dec. 16, 2008

(54) AV SYSTEM INCLUDING AMPLIFIER AND CONTENT REPRODUCING DEVICE WITH CONNECTION-BASED ON SCREEN DISPLAY

(75) Inventors: Dai Shimozawa, Neyagawa (JP); Hiroyuki Fukuma, Neyagawa (JP)

(73) Assignee: Onkyo Corporation, Neyagawa (JP)

( * ) Notice: Subject to any disclaimer, the term of this patent is extended or adjusted under 35 U.S.C. 154(b) by 664 days.

(21) Appl. No.: 11/012,220

(22) Filed: Dec. 16, 2004

(65) Prior Publication Data

US 2005/0141857 A1 Jun. 30, 2005

(30) Foreign Application Priority Data

Dec. 25, 2003 (JP) ............................ 2003-428825

(51) Int. Cl.
*H04N 5/445* (2006.01)
(52) U.S. Cl. ....................................... 348/569; 386/46
(58) Field of Classification Search ................ 386/125, 386/83, 46, 65.07; 340/3.51, 825.24; 348/569, 348/552, 705, E5.099; 725/25
See application file for complete search history.

(56) References Cited

U.S. PATENT DOCUMENTS

| | | | | |
|---|---|---|---|---|
| 5,815,082 A | * | 9/1998 | Welmer | ........................ 340/3.51 |
| 6,034,737 A | | 3/2000 | Koyama et al. | |
| 6,040,874 A | * | 3/2000 | Kim | ............................. 348/569 |
| 6,292,618 B1 | | 9/2001 | Ohara et al. | |
| 6,763,174 B2 | | 7/2004 | Ohara et al. | |
| 7,017,171 B1 | * | 3/2006 | Horlander et al. | .............. 725/25 |
| 7,027,716 B1 | * | 4/2006 | Boyle et al. | .................... 386/83 |
| 2002/0040474 A1 | | 4/2002 | Ohkita | |

FOREIGN PATENT DOCUMENTS

| | | | |
|---|---|---|---|
| JP | 06-187771 | | 7/1994 |
| JP | 08019059 A | * | 1/1996 |
| JP | AA 9-163258 | | 6/1997 |
| JP | 09326814 A | * | 12/1997 |
| JP | 10-79896 | | 3/1998 |
| JP | 10-271432 | | 10/1998 |
| JP | 2002-108326 | | 4/2002 |
| JP | 2002-112136 | | 4/2002 |

* cited by examiner

*Primary Examiner*—David E Harvey
(74) *Attorney, Agent, or Firm*—Renner, Otto, Boisselle & Sklar, LLP

(57) ABSTRACT

An AV receiver in an AV system determines the type of connection between the AV system and the display upon receiving a request for an OSD from the user. Based on the result of determination, if the AV receiver is connected to the display through a DVD reproducing device, the AV receiver transmits an OSD request including setting information to the DVD reproducing device. The DVD reproducing device produces an OSD signal based on the setting information and combines the signal with a DVD video signal for output to the display. The display displays video based on the DVD video signal as well as an OSD screen based on the OSD signal. Therefore, the AV system can display settings for the amplifier at the display regardless of the type of connection between the amplifier, the content reproducing device and the display.

19 Claims, 16 Drawing Sheets

AV SYSTEM INCLUDING AMPLIFIER AND CONTENT REPRODUCING DEVICE WITH CONNECTION-BASED ON SCREEN DISPLAY

BACKGROUND OF THE INVENTION

1. Field of the Invention

The present invention relates to an AV system, an amplifier, and a content reproducing device, and more particularly, to an AV system including an amplifier and a content reproducing device and connected to a display, and an amplifier and a content reproducing device in such an AV system.

2. Description of the Related Art

In recent years, AV systems including an amplifier such as an AV receiver and a content reproducing device such as a DVD reproducing device have come into wide use. As shown in FIG. 15, an AV receiver 100 in such an AV system 700 receives a DVD video signal DVS and an audio sound signal AS from a DVD reproducing device 300 connected to the AV receiver 100 and relays the DVD video signal DVS to a display 200. After prescribed signal processing is carried out to the received audio sound signal AS, the resulting signal is transmitted to the speaker 400. In this way, the user can enjoy high quality sounds resulting from processing by the AV receiver 100 while reproducing high picture quality video using the DVD reproducing device 300.

Another type of connection possible between the AV system 700 and the display 200 is the type of connection shown in FIG. 16. In this case, a DVD video signal DVS output from the DVD reproducing device 300 is directly input to the display 200. Therefore, the transmission path for the DVD video signal DVS is shorter than that of the connection in FIG. 15, and better picture quality can be provided.

The AV receiver 100 has an OSD (On Screen Display) function. By the OSD function, a screen for settings (hereinafter as "OSD screen") for the AV receiver 100 is displayed at the display 200. In this way, the user can adjust the settings for the AV receiver such as adjusting audio sounds while looking at the OSD screen. When the OSD screen is displayed, the AV receiver 100 outputs an OSD signal to the display 200.

Note however that in the connection in FIG. 16, the display 200 cannot display the OSD screen of the AV receiver 100. This is because the DVD reproducing device 300 cannot transmit the OSD signal output from the AV receiver 100 to the display 200 while outputting a DVD video signal DVS. Therefore, the user cannot adjust settings such as audio sounds for the AV receiver 100 while looking at the OSD screen while a DVD is reproduced. It is preferable that the user can carry out adjustment for synchronization while looking at the video and the OSD screen at the same time particularly when the video based on the DVD video signal DVS and audio sounds based on the audio sound signal AS are synchronized.

The same disadvantage is encountered in the type of connection in FIG. 15. When the DVD reproducing device 300 outputs the DVD video signal DVS, the AV receiver 100 can output the input DVD video signal DVS and an OSD signal it produces to the display 200 at the same time. However, when the DVD reproducing device 300 outputs a digital DVD video signal DVS such as an HDMI (High-Definition Multimedia Interface) signal and a DVI (Digital Visual Interface) signal, the AV receiver 100 cannot simultaneously transmit the digital DVD video signal DVS and the OSD signal it produces to the display 200. The AV receiver 100 cannot output a digitally input signal and another signal at the same time to the display 200, in other words, it can output only the digital signal.

SUMMARY OF THE INVENTION

It is an object of the invention to provide an AV system that can display settings for an amplifier at a display regardless of the type of connection among the amplifier, a content reproducing device, and the display.

Another object of the invention is to provide an AV system that can display settings for an amplifier at a display as well as video displayed at the display based on a video signal from a content reproducing device.

An AV system according to the invention has an amplifier and a content reproducing device and is connected to a display, and the amplifier includes a receiver, a determiner, and a requester. The receiver receives a request for OSD (On Screen Display). The determiner determines the type of connection between the amplifier and the content reproducing device when the receiver receives the request for OSD. The requester transmits an OSD request for displaying settings for the amplifier at the display to the content reproducing device when the determiner determines that the amplifier is connected to the display through the content reproducing device. The content reproducing device includes an OSD instructor instructing said display to display the settings for the amplifier when the OSD request is received. Herein, the amplifier is for example an AV amplifier or an AV receiver, and the content reproducing device is for example a reproducing device for a recording medium such as a DVD, an SACD (Super Audio Compact Disc), and a Blue-ray disk. A client device that receives and reproduces a content (such as audio sounds, video, and a still picture) distributed from a server on a network is included in the content reproducing device.

In the AV system according to the invention, when the amplifier is connected to the display through the content reproducing device, the amplifier transmits an OSD request to the content reproducing device and the content reproducing device upon receiving the OSD request has an OSD screen displayed at the display. Therefore, when the amplifier is connected to the display through the content reproducing device, the user can look at the OSD screen of the amplifier at the display.

Preferably, the determiner also determines whether the amplifier has received a digital video or still-picture signal from the content reproducing device, and the requester transmits an OSD request to the content reproducing device when the determiner determines that the amplifier is connected between the display and the content reproducing device and has received the digital video or still-picture signal. Herein, the digital signal refers to for example an HDMI signal or a DVI signal.

In this way, when the amplifier relays between the display and the content reproducing device, and has received a digital video or still-picture signal, the display can display video or a still picture based on the video signal or still-picture signal from the content reproducing device and the OSD screen based on the OSD request at the same time.

Preferably, the OSD request includes setting information for the amplifier. The content reproducing device includes a producer producing an analog video or still-picture signal or a digital video or still-picture signal. The OSD instructor includes a reproducing determiner, an OSD producer, and a combiner. The reproducing determiner determines whether the producer has produced the video signal or still-picture signal when the OSD request is received. The OSD producer produces an OSD signal based on the setting information when the producing determiner determines that the producer has produced the video signal or still-picture signal. The combiner outputs a composite signal produced by combining the OSD signal and the video signal or still-picture signal to the display.

In this way, when the amplifier is connected to the display through the content reproducing device, the display can display video or a still picture based on the video signal or still-picture signal from the content reproducing device and the OSD screen based on the OSD signal at the same time. Therefore, the user can look at settings for the amplifier while watching the video or still picture, which makes it easier for the user to adjust the settings for the amplifier.

Preferably, when the receiver receives a cancellation request for OSD, the requester transmits an OSD cancellation request to the content reproducing device, and the OSD producer stops producing the OSD signal when the OSD cancellation request is received.

In this way, output of the OSD signal is stopped based on the cancellation request for the OSD screen, and the OSD screen is no longer displayed at the display.

Preferably, the amplifier further includes an OSD output device. The OSD output device outputs an OSD signal for displaying settings for the amplifier at the display when the receiver receives the OSD request. The OSD instructor transmits the output OSD signal to the display upon receiving the OSD request.

When the amplifier is connected to the display through the content reproducing device, the display can display the OSD screen based on the OSD signal output from the amplifier.

Preferably, the OSD instructor includes a selector selecting one of the OSD signal and the video signal or the still-picture signal to output the selected signal to the display, and the selector selects the OSD signal upon receiving the OSD request.

In this way, the content reproducing device can switch the signal to be output from the content reproducing device from the video signal or still-picture signal to the OSD signal. More specifically, while the content reproducing device outputs a video signal produced inside or an externally applied video signal, the content reproducing device can switch the output signal from the video signal to the OSD signal. Therefore, when the amplifier is connected to the display through the content reproducing device, the display can receive the OSD signal output from the amplifier.

Preferably, when the receiver receives the cancellation request for OSD, the OSD output device stops outputting the OSD signal, the requester transmits an OSD cancellation request to the content reproducing device, and the selector selects the video signal or still-picture signal when the OSD cancellation request is received.

In this way, when the OSD screen is not displayed, the display can display video based on the video signal or still-picture signal.

Preferably, the determiner also determines whether the amplifier has received a digital video or still-picture signal from the content reproducing device, and the amplifier further includes an output device and an interrupter. The output device outputs the received digital video or still-picture signal as it is. The interrupter interrupts the digital video or still-picture signal when the determiner determines that the amplifier is connected between the display and the content reproducing device and has received the digital video or still-picture signal.

When the amplifier relays between the display and the content reproducing device, and the video signal or still-picture signal input to the amplifier is a digital signal, the interrupter interrupts the digital video or still-picture signal. Therefore, the amplifier can output the OSD signal.

Preferably, when the receiver receives a cancellation request for OSD, the OSD output device stops outputting the OSD signal, and the interrupter cancels interruption of the digital video or still-picture signal.

In this way, the amplifier can resume to transmit the digital video or still-picture signal after the display of the OSD screen ends.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
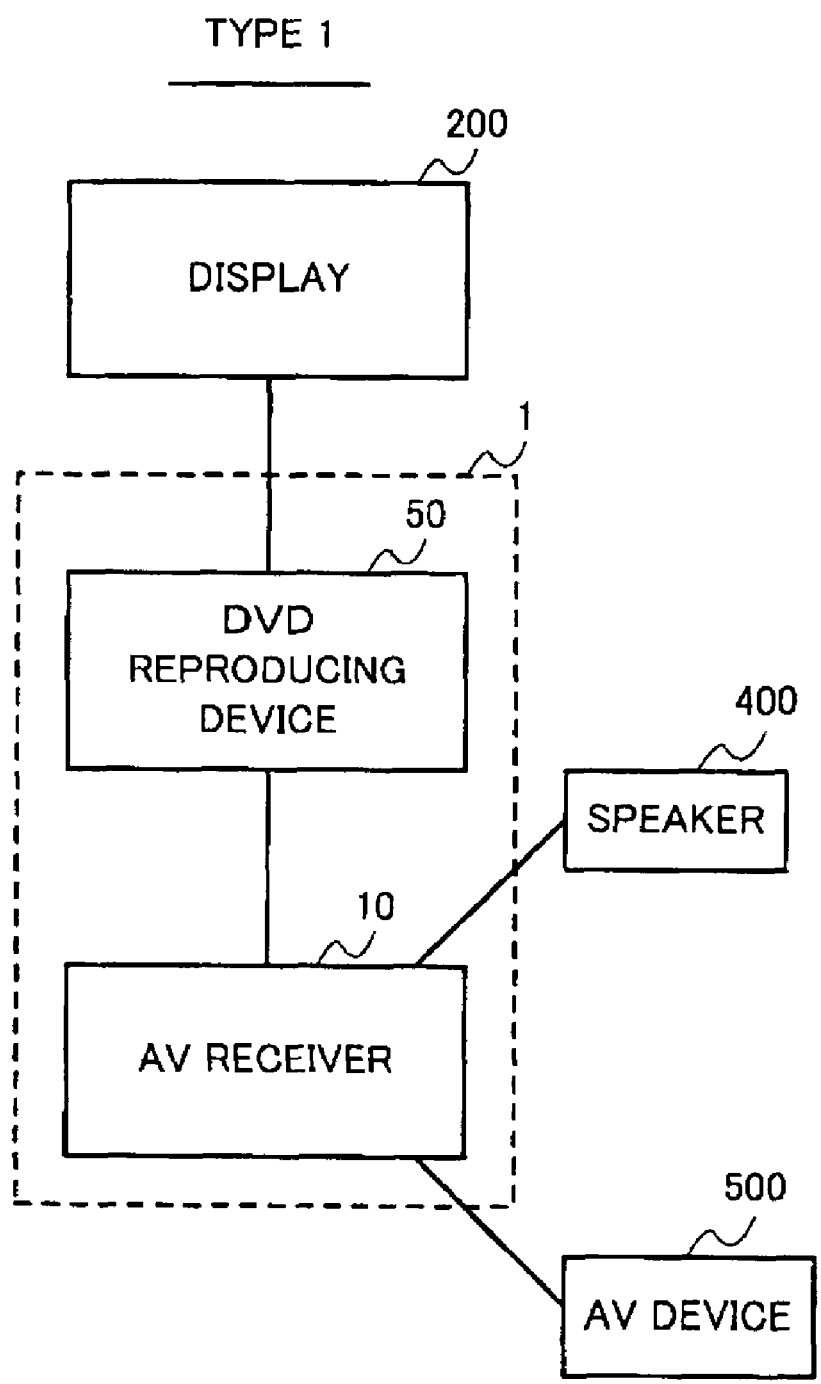
FIG. 1 is a block diagram showing a type of connection between an AV system and a display according to an embodiment of the invention.

Now, an embodiment of the invention will be described in detail in conjunction with the accompanying drawings. In the drawings, the same or corresponding portions are denoted by the same reference characters and their description will not be repeated.

1. General Structure

Figure 2:
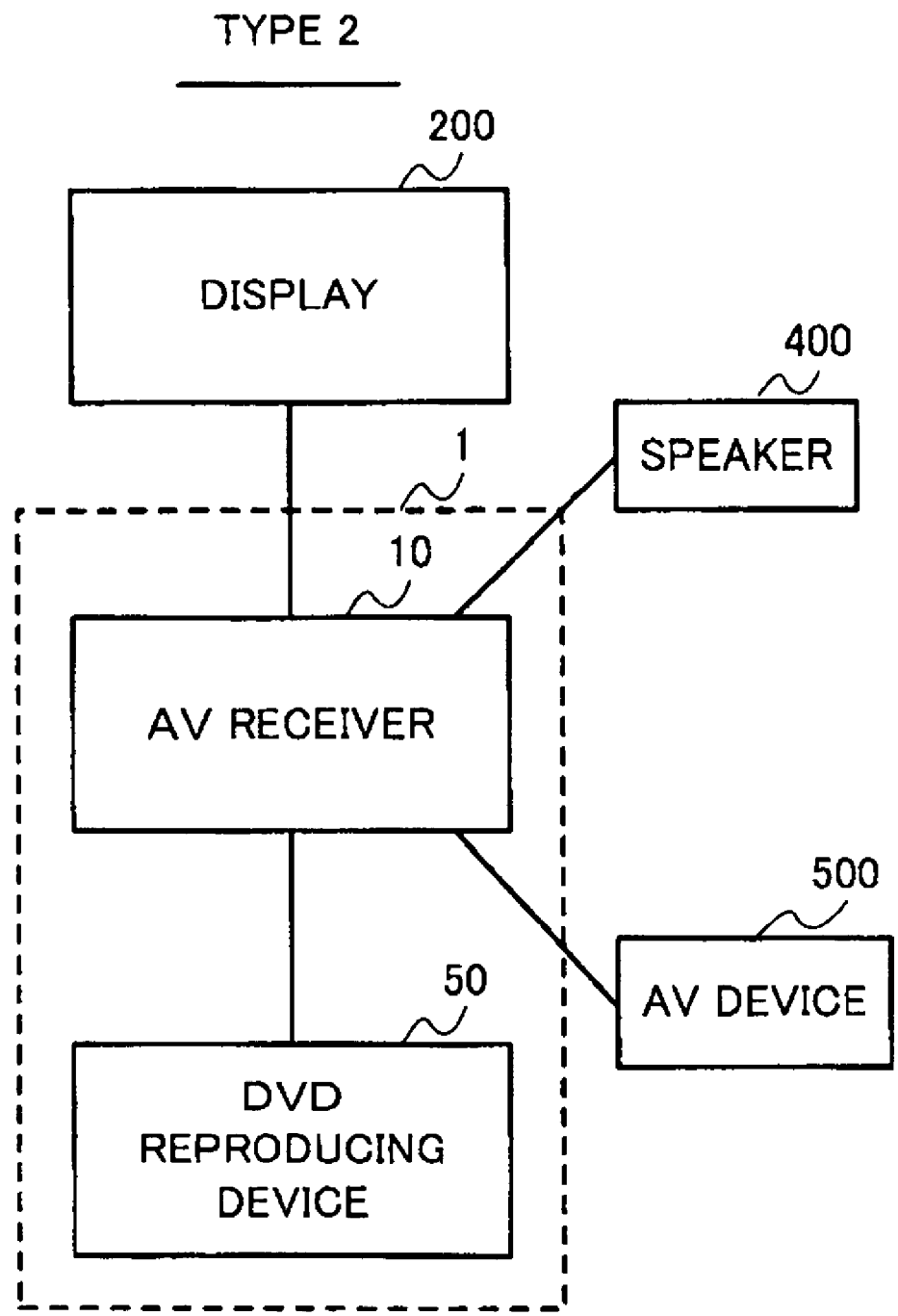
FIG. 2 is a block diagram showing another type of connection between the AV system and the display according to the embodiment.

As shown in FIGS. 1 and 2, an AV system 1 according to the embodiment includes an AV receiver 10 as an amplifier and a DVD reproducing device 50 as a content reproducing device. The AV system 1 is connected to a display 200.

The AV receiver 10, the DVD reproducing device 50, and the display 200 may be connected in two different types of connection. In FIG. 1, the AV receiver 10 is connected to the display 200 through the DVD reproducing device 50 in one type of connection (which will be referred to as "type 1"), while in FIG. 2, the AV receiver 10 relays between the display 200 and the DVD reproducing device 50 in the other type of connection (which will be referred to as "type 2").

Note that the AV receiver 10 is connected to a speaker 400 and outputs an audio sound signal AS received from the DVD reproducing device 50 to the speaker 400. The AV receiver 10 can be connected to one or more AV devices 500 other than the DVD reproducing device 50. The AV device 500 is for example a video decoder or an analog audio device.

Now, the structure of the AV receiver 10 and the DVD reproducing device 50 will be described in detail.

1. 1. Structure of AV Receiver

Figure 3:
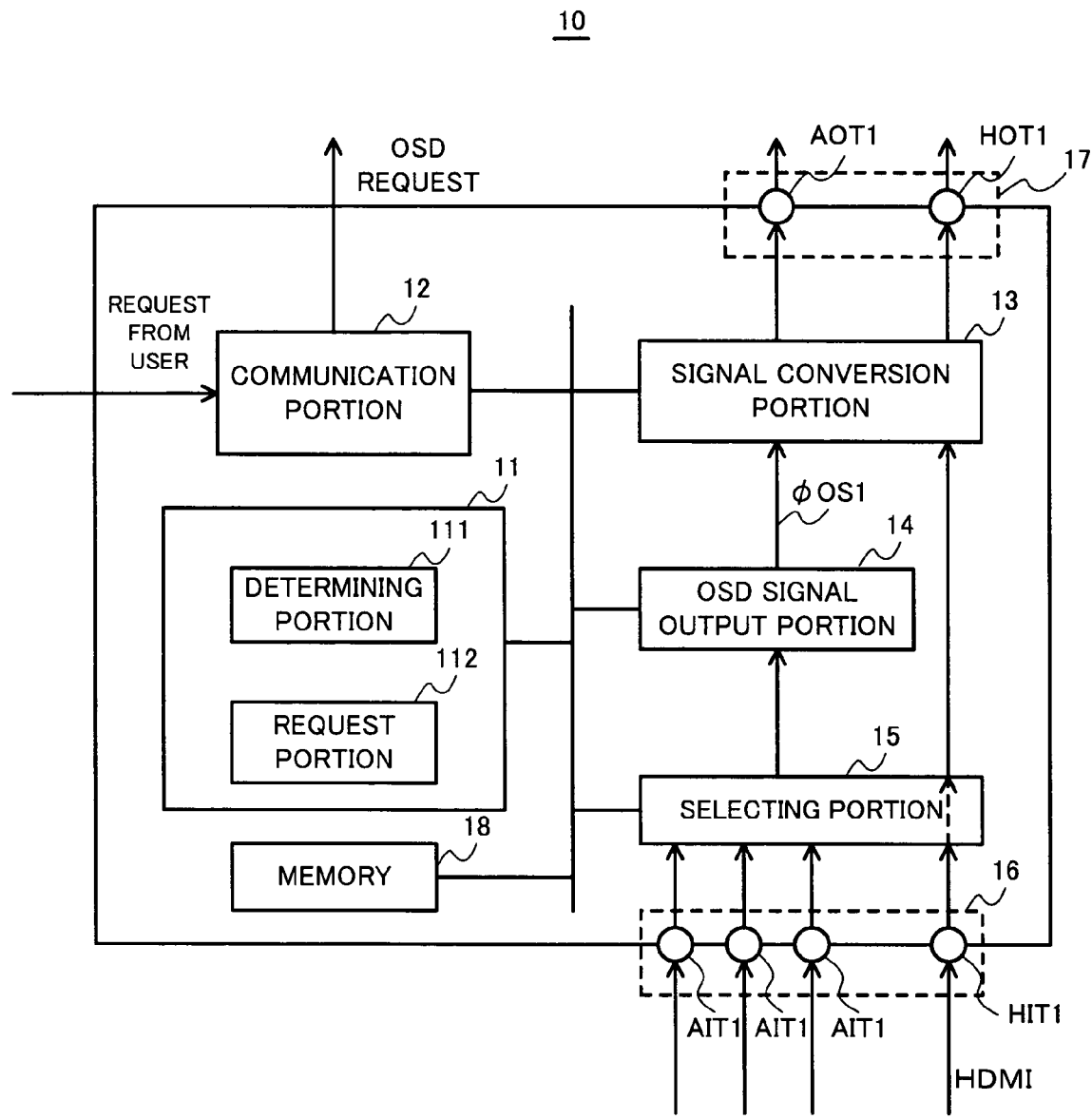
FIG. 3 is a functional block diagram showing details of the configuration of the AV receiver shown in FIGS. 1 and 2.

Referring to FIG. 3, the AV receiver 10 includes a control portion 11 that controls the AV receiver as a whole, a communication portion 12, a signal conversion portion 13, an OSD signal output portion 14, a selecting portion 15, and a memory 18. The AV receiver 10 further includes an input terminal group 16 and an output terminal group 17.

The input terminal group 16 includes a plurality of analog input terminals AIT1 (Analog Input Terminal) and an HDMI input terminal HIT1 (HDMI Input Terminal). The plurality of analog input terminals AIT1 can be connected to one or more AV devices 500 and receive an analog video signal from such a connected AV device 500.

Meanwhile, the HDMI input terminal HIT1 is connected to the AV device 500 or the DVD reproducing device 50 that outputs a digital, HDMI video signal. In the type 2 connection shown in FIG. 2, the DVD reproducing device 50 is connected to the HDMI input terminal HIT1.

The selecting portion 15 selects a signal to be transmitted to the display 200 among externally applied signals input from the input terminal group 16. When video the user desires to display at the display 200 is video to be reproduced by the AV device 500 such as a video decoder, the selecting portion 15 selects an analog input terminal AIT1 connected with the AV device 500 and disconnects from the other analog input terminals AIT1 and the HDMI input terminal HIT1. In this way, the AV receiver 10 can select a desired video signal.

The communication portion 12 receives a request for OSD or a cancellation request for OSD from the user. The user can transmit the request or cancellation request for OSD to the AV receiver 10 by operating for example a remote that is not shown. The communication portion 12 outputs an OSD request or an OSD cancellation request to the DVD reproducing device 50. The communication portion 12 is for example an IEEE1394 interface.

The OSD signal output portion 14 responds to the request for OSD received at the communication portion 12 to generate an OSD signal φOS1 based on settings for the AV receiver 10 and output the signal. When an analog video signal is input from the analog input terminal AIT1, the OSD signal output portion 14 outputs a composite signal produced by combining the generated OSD signal φOS1 and the analog video signal. Note that when the request for OSD is not received from the user, the OSD signal output portion 14 does not generate the OSD signal OSD φOS1 and directly transmits the video signal output from the selecting portion 15 to the signal conversion portion 13.

The signal conversion portion 13 provides prescribed processing to the signal output from the OSD signal output portion 14 and externally outputs the resulting signal. At the time, the signal may be output from an analog output terminal AOT1 (Analog Output Terminal) as an analog signal or may be converted into an HDMI signal for output from an HDMI output terminal HOT1 (HDMI Output Terminal).

Note that when the selecting portion 15 selects the HDMI input terminal HIT1, the input HDMI video signal is directly output from the output terminal HOT1 without being processed at the OSD signal output portion 14 and the signal conversion portion 13. Therefore, the AV receiver 10 cannot combine the HDMI video signal with the OSD signal φOS1.

The control portion 11 is a computer. The control portion 11 includes a determining portion 111 and a request portion 112. The determining portion 111 determines whether the connection among the AV receiver 10, the DVD reproducing device 50, and the display 200 is the type 1 connection or the type 2 connection. The connection information (regarding whether it is the type 1 or 2) is registered in the memory 18, and therefore the determining portion 111 determines the type by referring to the registered information.

When it is determined that the connection is the type 2 connection, the determining portion 111 then determines whether the input video signal is an HDMI signal. At the time, the determining portion 111 determines based on the input terminal selected by the selecting portion 15 at the time of determination, in other words, based on the input terminal that is not disconnected. More specifically, when the selecting portion 15 selects the HDMI input terminal HIT1 at the time of determination, the determining portion 111 determines that the input video signal is an HDMI signal.

The request portion 112 outputs an OSD request based on the determination by the determining portion 111 when the communication portion 12 receives a request for OSD from the user. At the time, the OSD request includes setting information shown in Table 1.

TABLE 1

| | setting information | |
|---|---|---|
| | set item | AV sync |
| | set value | 92 ms |
| how to display | set item display position | L, line 1, columns 29 to 34 |
| | set item background transparency | transparent |
| | set value display position | R, line 1, columns 28, 29, 31, 32 |
| | set value background transparency | transparent |

Referring to Table 1, for the "set item" in the setting information, a set item to be displayed at the OSD screen is registered. In Table 1, an item for correcting disagreements between video and audio sounds, i.e., "AV sync" is registered. For the "set value," the present set value for the item is registered. The value "92 ms" indicates that the sounds are 92 ms ahead of the video. For the "set item display position" and the "set value display position," the positions of the set item and set value displayed on the screen of the display 200 are registered. For the "set item background transparency" and the "set value background transparency," whether a set item or a set value is displayed with a transparent background or a semi-transparent background at the display 200 is registered.

Note that as will be described, the request portion 112 outputs an OSD request that does not include setting information in some cases. The request portion 112 outputs an OSD cancellation request based on the determination of the determining portion 111 when the communication portion 12 receives a cancellation request for OSD from the user.

When an operation program is installed in the memory 18, the AV receiver 10 can carry out the following operation.

1. 2. Structure of DVD Reproducing Device

Figure 4:
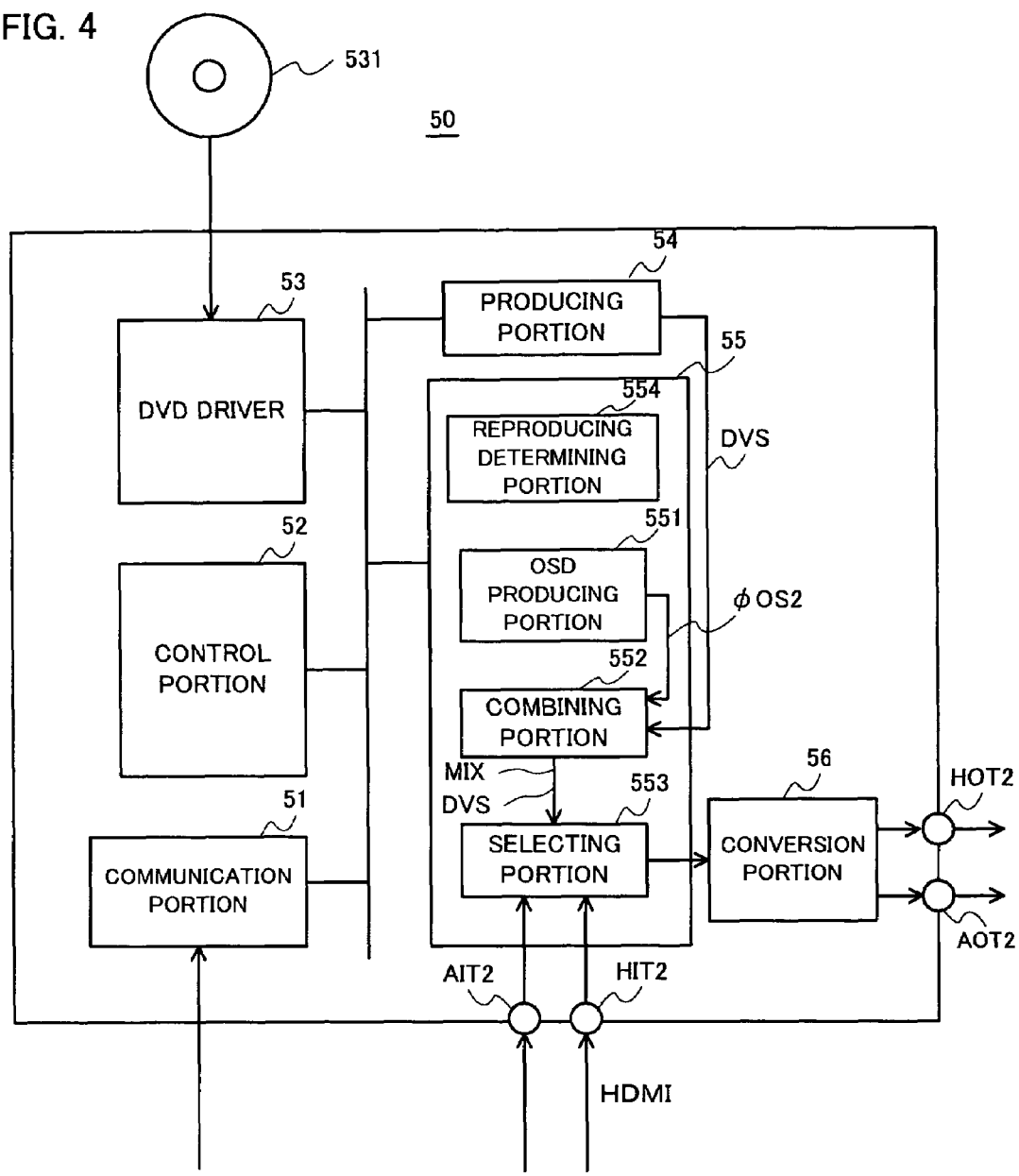
FIG. 4 is a functional block diagram showing details of the configuration of the DVD reproducing device shown in FIGS. 1 and 2.

Referring to FIG. 4, the DVD reproducing device 50 includes a communication portion 51, a control portion 52, a DVD driver 53, a producing portion 54, an OSD instructing portion 55, and a conversion portion 56. The DVD reproducing device 50 further includes an HDMI input terminal HIT2, an analog input terminal AIT2, an HDMI output terminal HOT2, and an analog output terminal AOT2.

The communication portion 51 receives an OSD request or an OSD cancellation request transmitted from the AV receiver 10. The communication portion 51 is for example an IEEE1394 interface. The control portion 52 is a computer and controls the DVD reproducing device 50 as a whole. The producing portion 54 produces a DVD video signal DVS based on a DVD 531 stored in the DVD driver 53. Note that the producing portion 54 may produce a still-picture signal. The producing portion 54 may produce either analog or digital signals.

The OSD instructing portion 55 includes an OSD producing portion 551, a combining portion 552, a selecting portion 553, and a reproducing determining portion 554. The reproducing determining portion 554 determines whether the producing portion 54 has produced the DVD video signal DVS. The OSD producing portion 551 produces an OSD signal φOS2 based on setting information in the received OSD request when the DVD reproducing device 50 receives the OSD request and the reproducing determining portion 554 determines that the producing portion 54 has produced the DVD video signal DVS.

The combining portion 552 combines the DVD video signal DVS and the OSD signal φOS2 to output a composite signal MIX. When the OSD signal φOS2 is not produced and only the DVD video signal DVS is produced, the DVD video signal DVS is output as it is.

When the type 1 connection is established, the selecting portion 553 selects one of an analog signal input from the analog input terminal AIT2, an HDMI signal input from the HDMI input terminal HIT2, and the output signal of the combining portion 552 and outputs the selected signal to the conversion portion 56.

The conversion portion 56 carries out prescribed conversion in response to the signal output from the selecting portion 553. If the signal output from the selecting portion 553 is the analog signal, the DVD video signal DVS, or the composite signal MIX, the conversion portion 56 carries out I/P conversion and resolution conversion to the analog signal and converts the signal into an HDMI signal if necessary for output to the outside.

If the selecting portion 553 selects the HDMI signal input from the HDMI input terminal HIT2, the conversion portion 56 outputs the HDMI signal as it is to the outside through the HDMI output terminal HOT2.

The DVD reproducing device 50 has an operation program installed in an internal memory that is not shown and can operate as the DVD reproducing device 50 as follows.

2. First OSD Operation

Now, the operation of the AV system 1 to display the OSD screen of the AV receiver 10 at the display 200 (OSD operation) will be described.

2. 1. General Description of Operation

For Type 1 Connection

Figure 5:
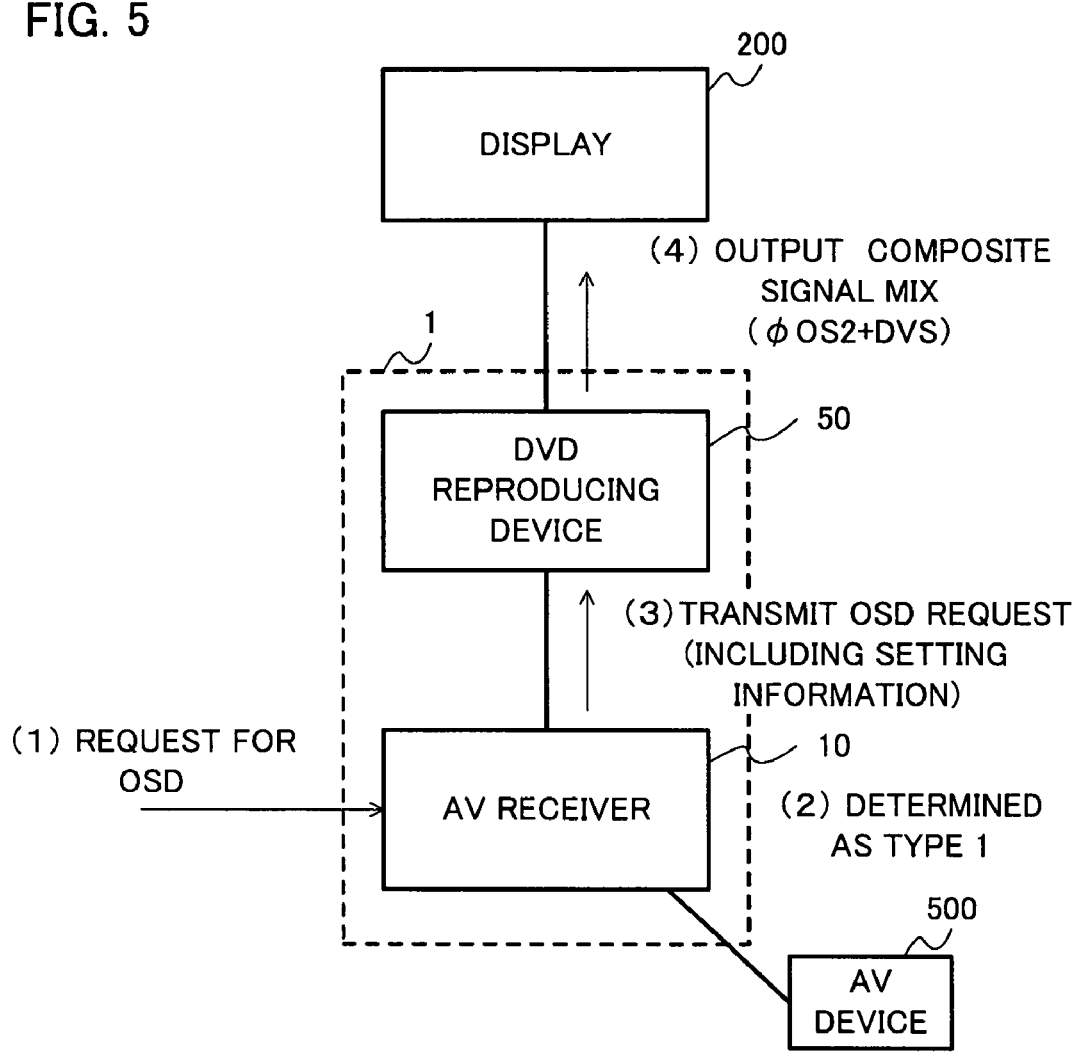
FIG. 5 is a schematic diagram showing the general operation of the AV system shown in FIG. 1.

Referring to FIG. 5, the AV receiver 10 receives a request for an OSD from the user while the DVD reproducing device 50 produces a DVD 531 (1). The AV receiver 10, upon receiving the request, determines the connection between the AV system 1 and the display 200 as the type 1 connection (2). At the time, the AV receiver 10 transmits an OSD request including setting information to the DVD reproducing device 50 (3).

The DVD reproducing device 50, upon receiving the OSD request, produces an OSD signal φOS2 based on the setting information in the OSD request and outputs a composite signal MIX produced by combining the OSD signal φOS2 and the DVD video signal DVS to the display 200 (4). The display 200 receives the composite signal MIX and displays video and the OSD screen based on the composite signal MIX at a time.

In this way, for the type 1 connection, the video and the OSD screen of the AV receiver 10 can simultaneously be displayed at the display 200. Therefore, the user can adjust settings for the AV receiver 10 while looking at the screen, so that audio sounds can easily be synchronized to the video.

Note that when video based on an analog video signal output from the AV device 500 is displayed at the display 200 and the AV receiver 10 receives a request for an OSD from the user, the AV receiver 10 can combine the OSD signal φOS1 produced by the OSD signal output portion 14 and the analog video signal and output the composite signal to the display 200 through the DVD reproducing device 50. Therefore, similarly to the conventional AV system, the user can adjust settings for the AV receiver 10 while looking at the screen.

For Type 2 Connection

Figure 6:
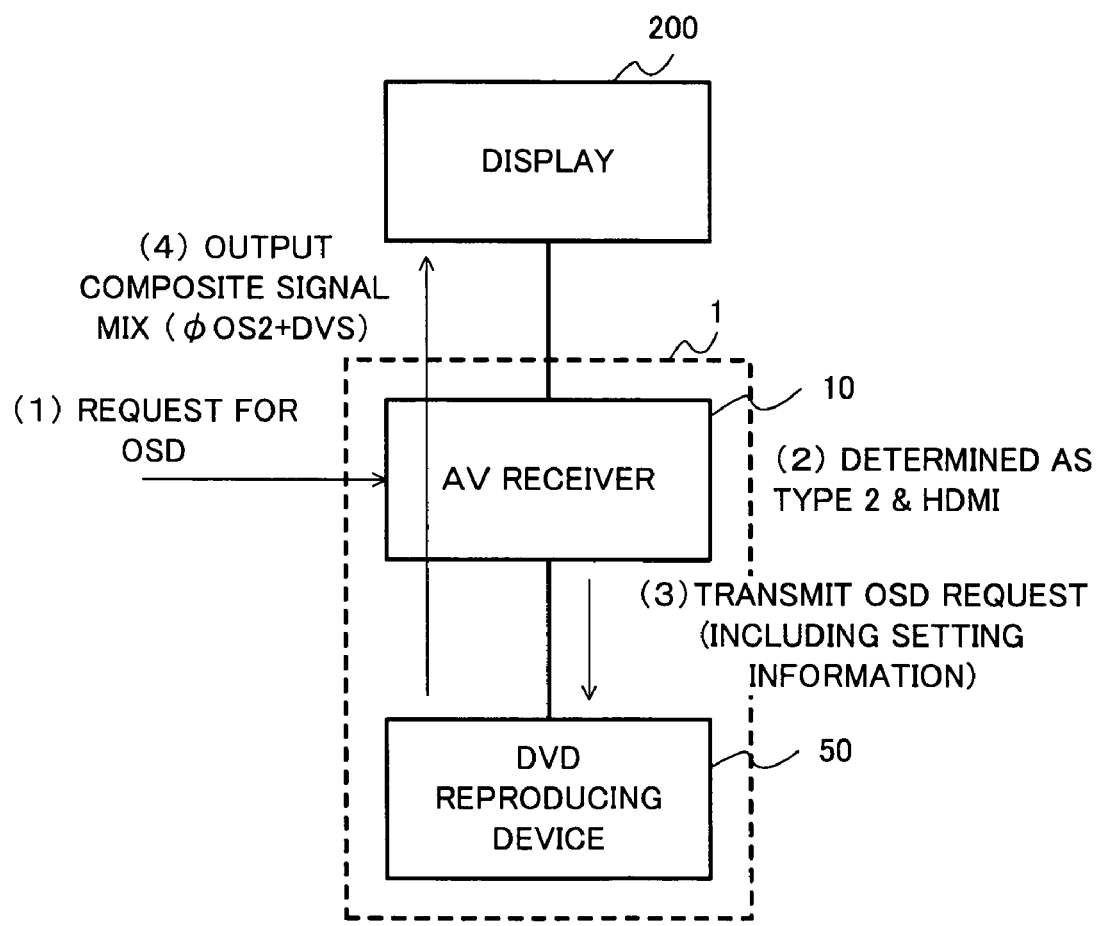
FIG. 6 is a schematic diagram showing the general operation of the AV system shown in FIG. 2.

Referring to FIG. 6, while reproducing the DVD 531, the DVD reproducing device 50 outputs an HDMI DVD video signal DVS. Therefore, the AV receiver 10 relays the HDMI DVD video signal DVS directly to the display 200.

When the AV receiver 10 receives a request for an OSD from the user (1), it is determined that the connection is the type 2 connection and that the HDMI DVD video signal DVS is relayed (2). Therefore, the AV receiver 10 transmits an OSD request including setting information to the DVD reproducing device 50(3).

The DVD reproducing device 50 outputs a composite signal MIX produced by combining the OSD signal φOS2 produced based on the setting information and the DVD video signal DVS as an HDMI signal (4). Therefore, the AV receiver 10 relays the HDMI composite signal MIX to the display 200 as it is.

In this way, for the type 2 connection, if the video signal input to the AV receiver 10 is an HDMI signal, the video and the OSD screen of the AV receiver 10 can simultaneously be displayed at the display 200.

Now, the operation of the AV receiver 10 and the DVD reproducing device 50 will be described in detail.

2. 2. Details of Operation of AV Receiver and DVD Reproducing Device

Figure 7:
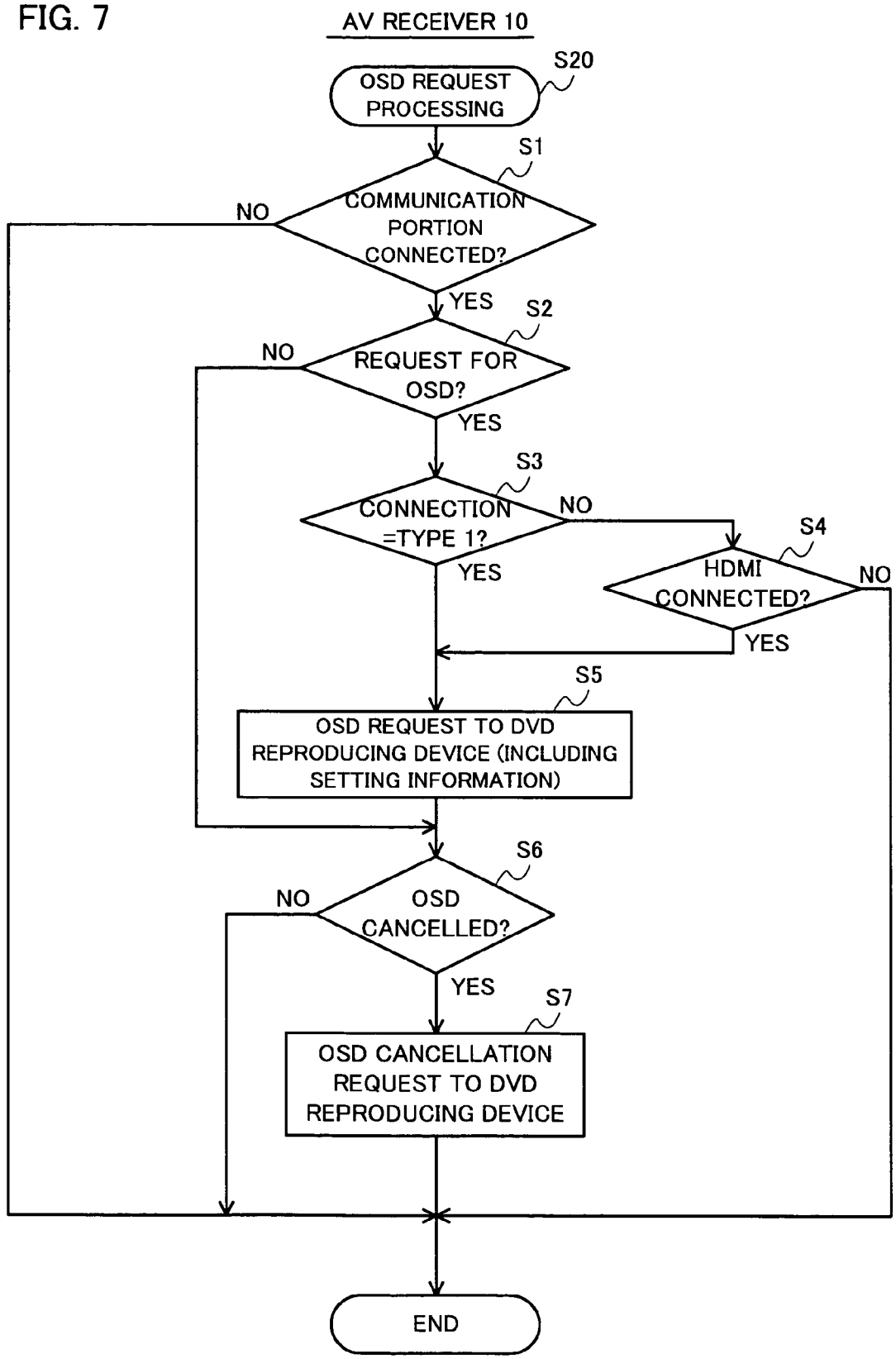
FIG. 7 is a flowchart for use in illustration of the operation of the AV receiver shown in FIGS. 5 and 6.
Figure 8:
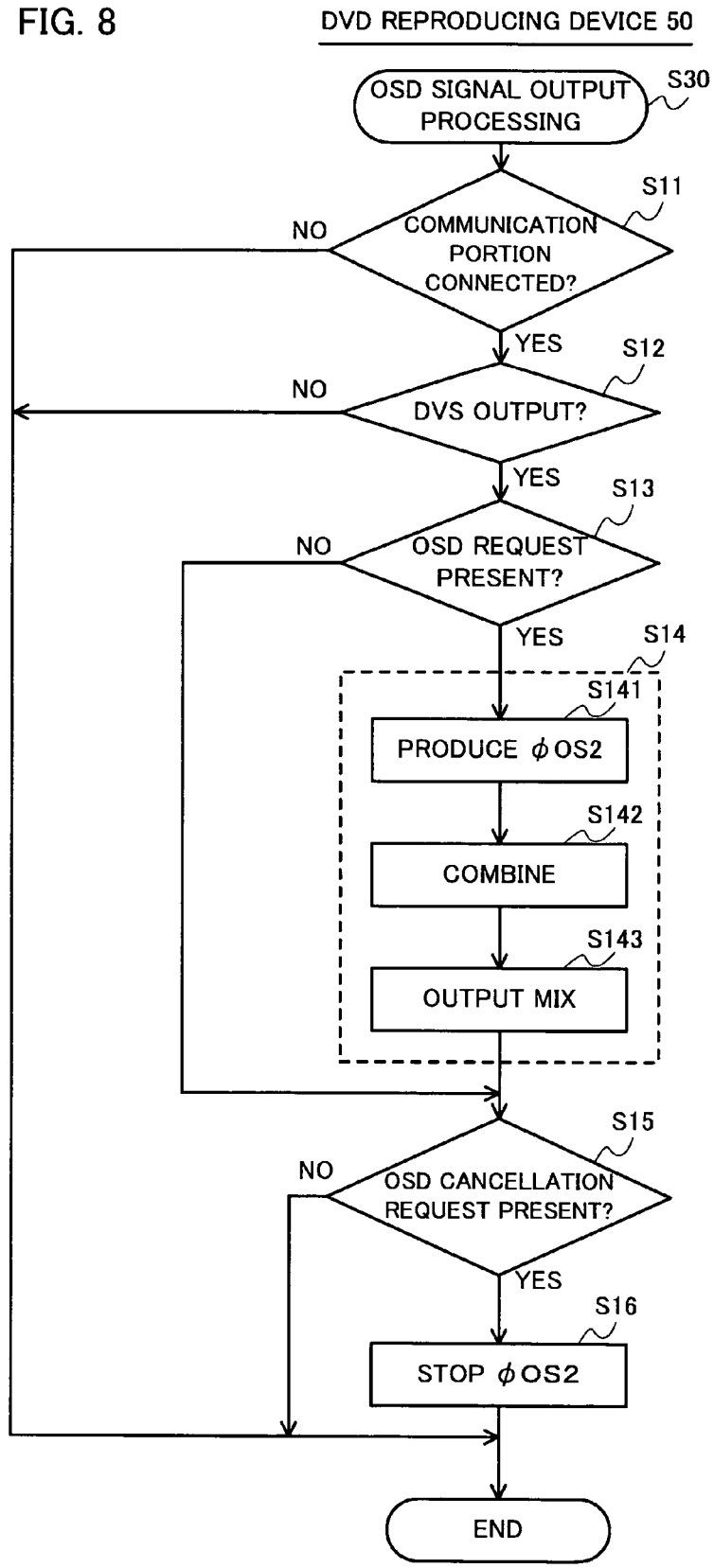
FIG. 8 is a flowchart for use in illustration of the operation of the DVD reproducing device shown in FIGS. 5 and 6.

Referring to FIGS. 7 and 8, the AV receiver 10 repeats OSD request processing (S20) shown in FIG. 7 at prescribed intervals, and the DVD reproducing device 50 repeats OSD signal output processing (S30) shown in FIG. 8 at prescribed intervals.

For Type 1 Connection

The AV receiver 10 initially determines whether the communication portion 12 is connected to the communication portion 51 in the DVD reproducing device 50 (S1). If there is no connection, the OSD request processing ends.

If the communication portion 12 is connected to the communication portion 51, and the AV receiver 10 receives a request for an OSD from the user (S2), the AV receiver 10 determines the type of connection (S3). At the time, the determining portion 111 determines the connection as the type 1 connection.

After the connection is determined as the type 1 connection, the request portion 112 outputs an OSD request to the DVD reproducing device 50 (S5). At the time, the OSD request includes setting information as given in Table 1. At the time, the AV receiver 10 does not receive a cancellation request for an OSD from the user (S6), and therefore the OSD request processing ends (S20).

Meanwhile, in the OSD signal output processing (S30), while reproducing the DVD 531, the DVD reproducing device 50 initially determines that the communication portion 51 is connected to the communication portion 12 (S11) and then determines that the producing portion 54 produces a DVD video signal DVS (S12). When the OSD request output in step S5 is received by the communication portion 51, the control portion 52 determines that the OSD request has been received (S13). At the time, the control portion 52 instructs the OSD instructing portion 55 to carry out processing to display the OSD screen at the display 200 (S14).

In response to the instruction of the control portion 52, the OSD producing portion 551 produces an OSD signal φOS2 based on the setting information (S141). Then, the combining portion 552 combines the OSD signal φOS2 and the DVD video signal DVS to produce a composite signal MIX (S142). The produced composite signal MIX is output to the display 200 through the selecting portion 553 and the conversion portion 56 (S143).

Figure 9:
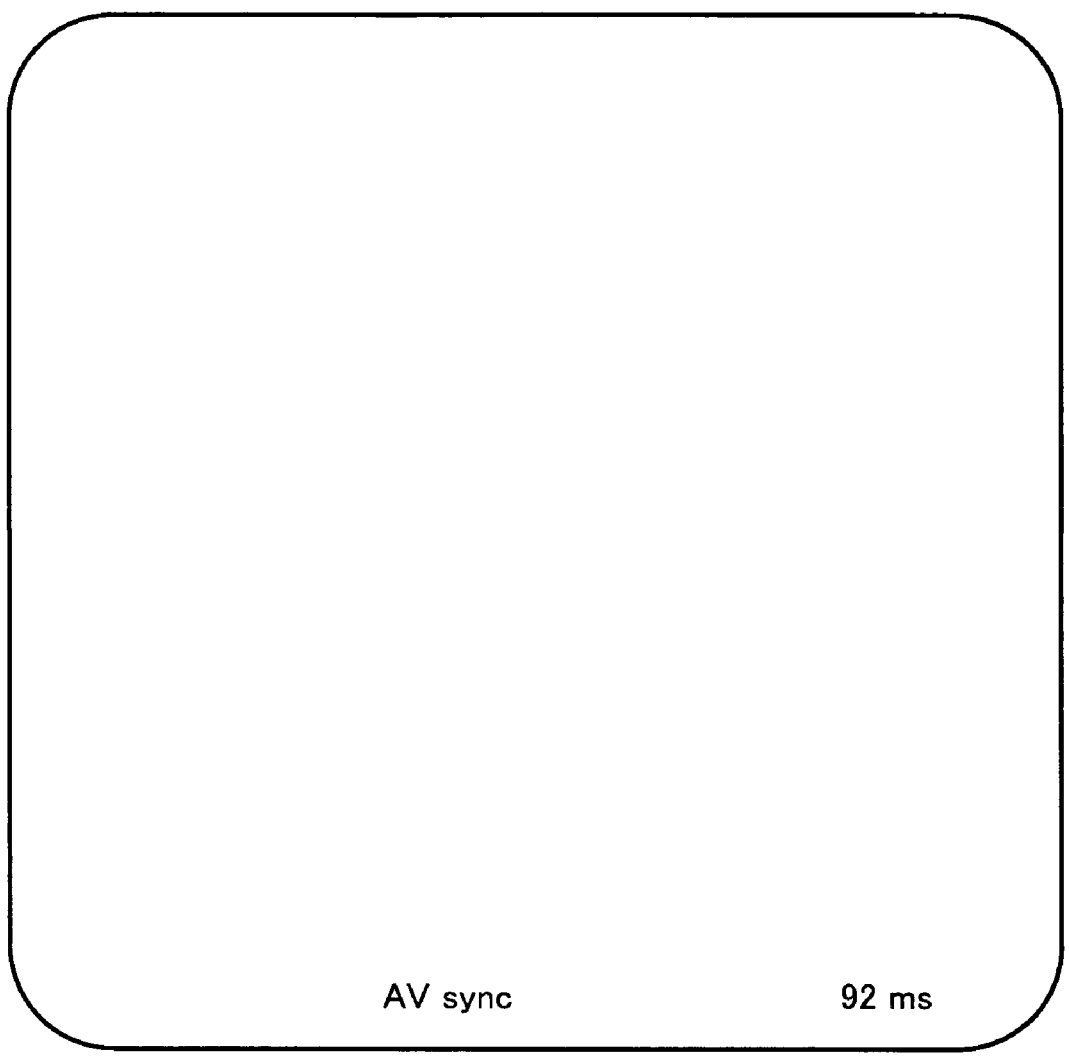
FIG. 9 is a schematic diagram of an OSD screen displayed at the display shown in FIGS. 5 and 6.

The display 200 receives the composite signal MIX and displays the OSD screen of the AV receiver 10 together with video as shown in FIG. 9. At the time, based on the set item display position in the setting information, the set item "AV sync" is displayed, and the set value "92 ms" is displayed based on the set value display position. The settings (AV sync, 92 ms) for the AV receiver 10 are displayed together with the video, and therefore the user can adjust the settings for the AV receiver 10 using for example a remote that is not shown while looking at the video. Note that after step S14, the DVD reproducing device 50 ends the OSD signal processing (S30).

Note that in the OSD processing (S20), the AV receiver 10 receives a request for an OSD (S2) and outputs an OSD request (S5) every time the user adjusts settings for the AV receiver 10. Meanwhile, in the OSD signal output processing (S30), the DVD reproducing device 50 carries out the processing in step S14 every time it receives an OSD request. Therefore, the OSD screen is displayed at the display 200 every time adjustment is made. Consequently, the user can adjust the set values for the AV receiver 10 while looking at the screen.

The user ends the setting adjustment and requests the AV receiver 10 to cancel the OSD, the AV receiver 10 determines that a cancellation request for the OSD has been received from the user in step S6 in the OSD request processing (S20). Therefore, the request portion 112 outputs an OSD cancellation request to the DVD reproducing device 50 (S7). At the time, in the OSD signal output processing (S30), the DVD reproducing device 50 determines that the OSD cancellation request has been received in step S15. Therefore, the OSD producing portion 551 stops producing the OSD signal φOS2 (S16). At the time, the combining portion 552 outputs only the DVD video signal DVS to the selecting portion 553. In this way, only the DVD video signal DVS is output to the display 200 from the DVD reproducing device 50. The display 200 therefore displays only the video and does not display the OSD screen.

For Type 2 Connection

In the OSD request processing (S20), the AV receiver 10 receives a request for an OSD from the user (S2) and then determines the connection type (S3). At the time, the determining portion 111 determines the connection as the type 2 connection, and therefore the determining portion 111 determines whether the DVD video signal DVS output from the DVD reproducing device 50 and input to the AV receiver 10 is an HDMI signal (S4). More specifically, it is determined whether the HDMI input terminal HIT1 of the AV receiver 10 and the HDMI output terminal HOT2 of the DVD reproducing device 50 are connected.

If the DVD video signal DVS is an HDMI signal based on the result of the determination, the request portion 112 outputs an OSD request (S5). In the following OSD request processing (S20) and the OSD signal output processing (S30), the same operation as that for the type 1 connection is carried out.

In this way, while the DVD reproducing device 50 reproduces the DVD 531, the AV system 1 according to the embodiment can display the video together with the OSD screen of the AV receiver 10 at the display 200 regardless of the connection type. Consequently, the user can adjust settings for the AV receiver 10 in synchronization with the video, which is advantageous for example in adjusting lip-sync.

3. Second OSD Operation

The OSD screen of the AV receiver 10 can be displayed at the display 200 by other methods while the DVD reproducing device 50 reproduces the DVD 531. Now, such operation will be described.

3. 1. General Description of Operation

For Type 1 Connection

Figure 10:
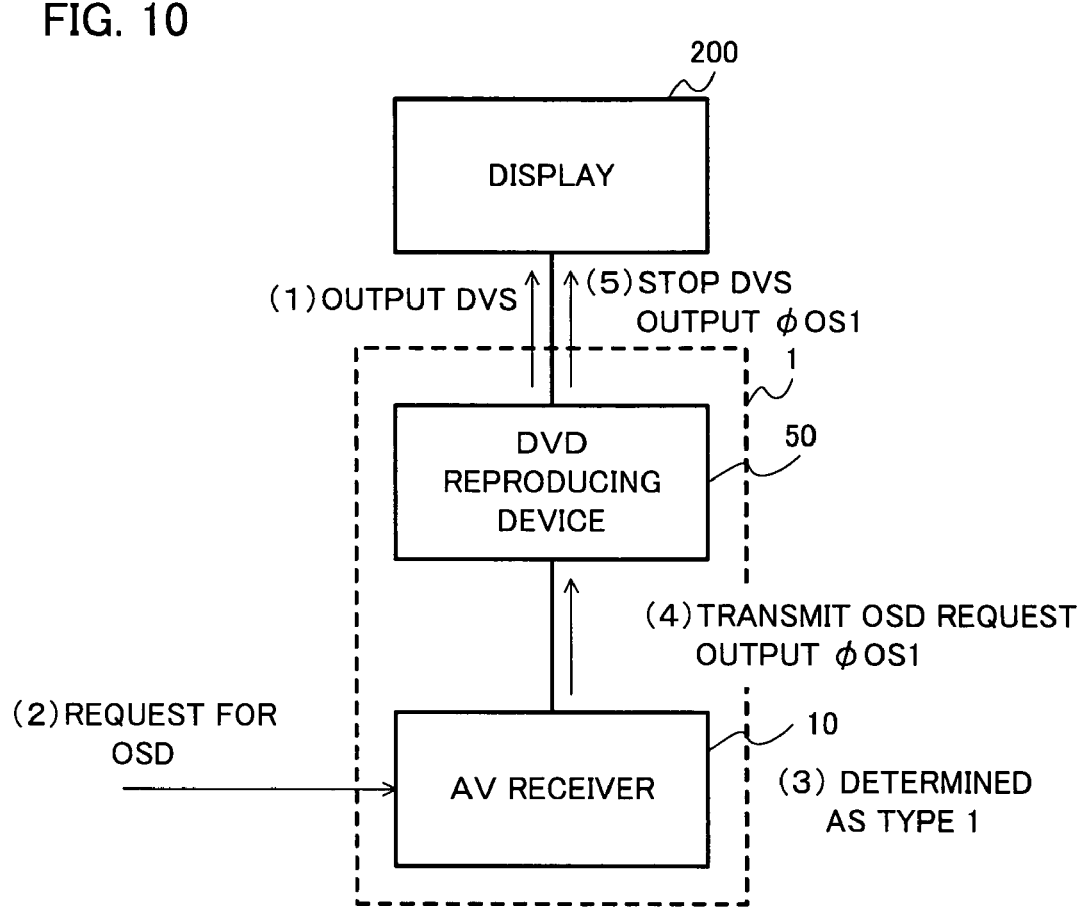
FIG. 10 is a schematic diagram showing another example of the operation of the AV system shown in FIG. 1.

Referring to FIG. 10, when the DVD reproducing device 50 reproduces the DVD 531 (1), the AV receiver 10 receives a request for an OSD from the user (2).

Upon receiving the request, the AV receiver 10 determines that the connection is the type 1 connection (3). Therefore, the AV receiver 10 outputs an OSD request to the DVD reproducing device 50 (4). The OSD request output at the time does not include setting information. Therefore, the AV receiver 10 outputs an OSD signal φOS1 for displaying the settings for itself (4).

Upon receiving the OSD request, the DVD reproducing device 50 stops outputting the DVD video signal DVS and transmits the OSD signal φOS1 from the AV receiver 10 to the display 200 (5).

In this way, the display 200 can display the OSD screen of the AV receiver 10 while the DVD reproducing device 50 reproduces the DVD 531.

For Type 2 Connection

Figure 11:
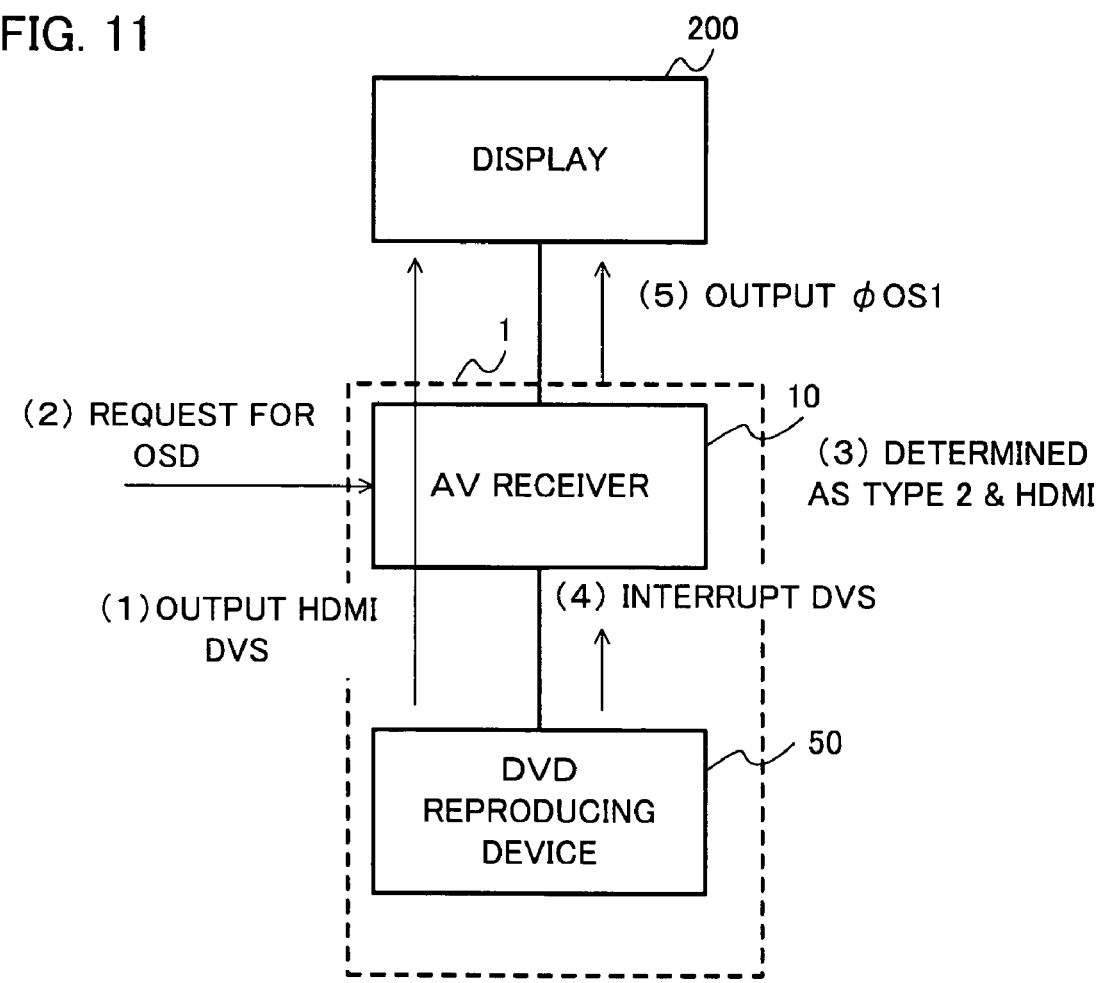
FIG. 11 is a schematic diagram showing another example of the operation of the AV system shown in FIG. 2.

Referring to FIG. 11, when the DVD reproducing device 50 outputs an HDMI DVD video signal DVS (1), the AV receiver 10 receives a request for an OSD request from the user (2), and determines that the connection is the type 2 connection and the DVD video signal is an HDMI signal (3). At the time, the AV receiver 10 interrupts the DVD video signal DVS (4), and outputs an OSD signal φOS1 it produces to the display 200 (5).

In this way, when the connection is the type 2 connection, the OSD screen of the AV receiver 10 can be displayed at the display 200 based on the OSD signal φOS1.

Now, details of the operation will be described.

3. 2. Details of Operation of AV Receiver and DVD Reproducing Device

For Type 1 Connection

Figure 12:
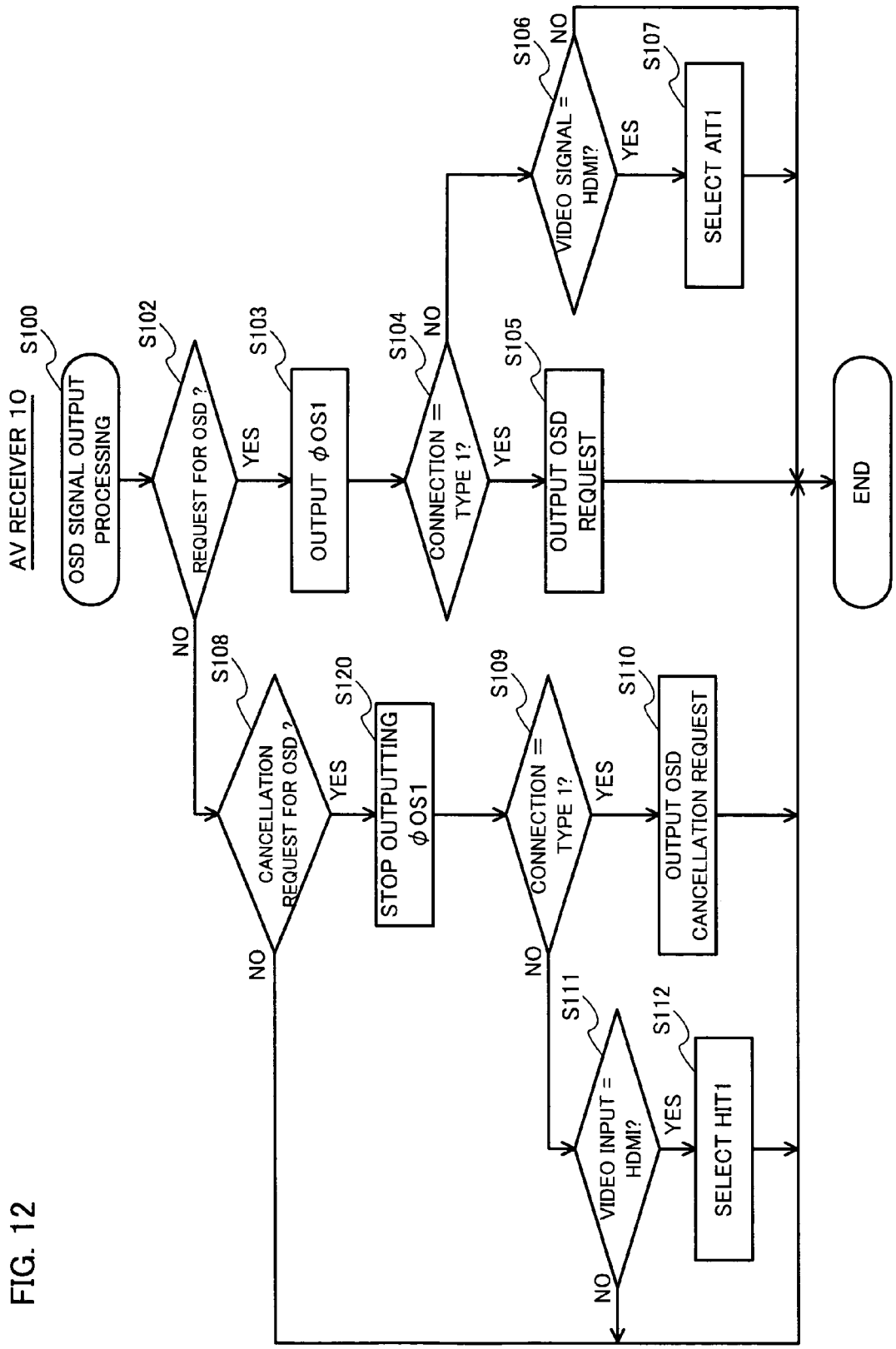
FIG. 12 is a flowchart for use in illustration of another example of the operation of the AV receiver shown in FIGS. 10 and 11.
Figure 13:
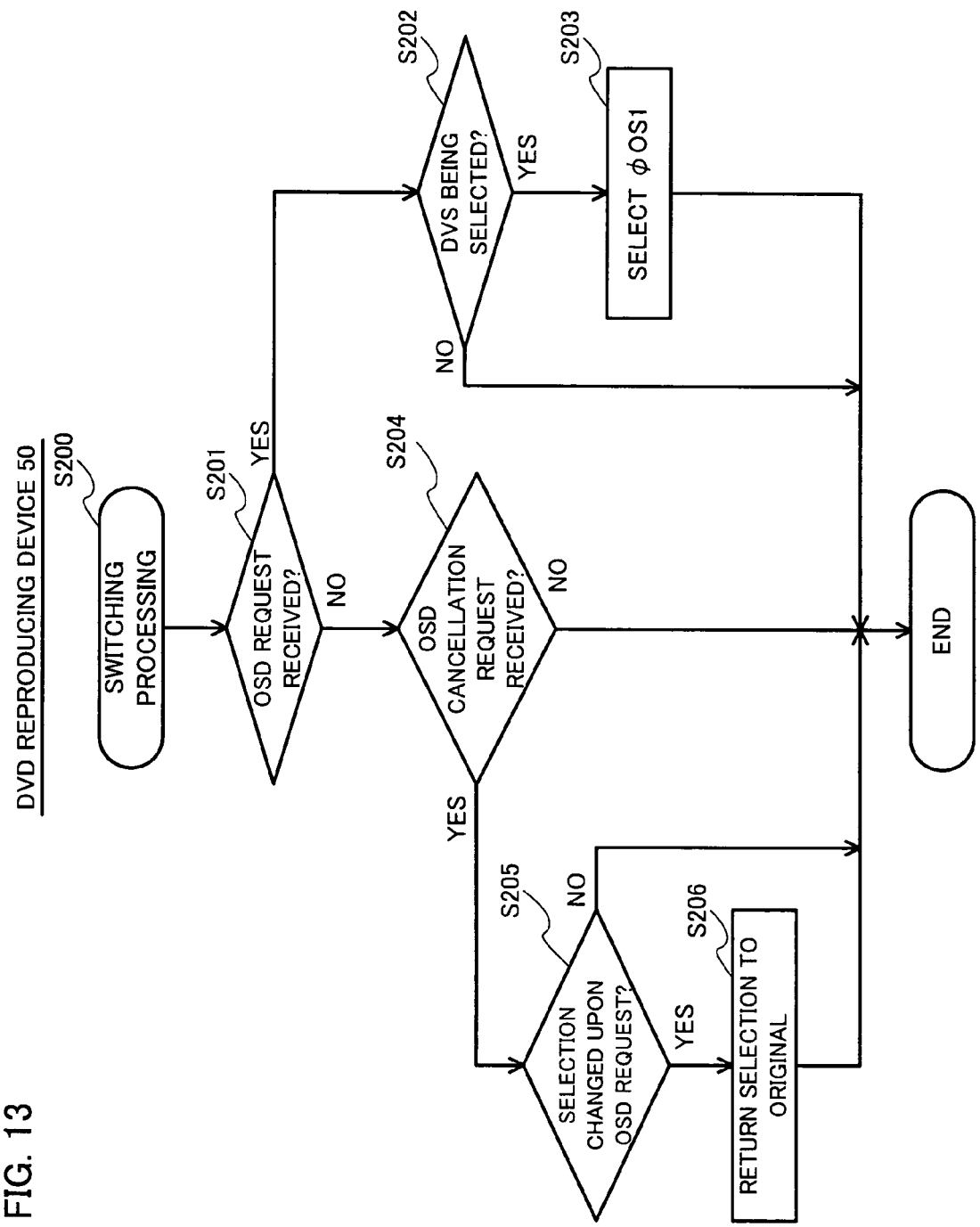
FIG. 13 is a flowchart for use in illustration of the operation of the DVD reproducing device shown in FIGS. 10 and 11.

Referring to FIGS. 12 and 13, the AV receiver 10 carries out OSD signal output processing shown in FIG. 12 at prescribed intervals (S100). Meanwhile, the DVD reproducing device 50 carries out switching processing shown in FIG. 13 at prescribed intervals (S200).

When the AV receiver 10 receives a request for an OSD from the user (S102), the OSD signal output portion 14 outputs the OSD signal φOS1 (S103). At the time, the OSD signal φOS1 output through the signal conversion portion 13 is output as an analog signal.

The determining portion 111 determines the type of connection (S104). Since the connection is the type 1 connection, the request portion 112 outputs an OSD request to the DVD reproducing device 50 (S105). Therefore, the OSD request and the OSD signal φOS1 are output from the AV receiver 10 to the DVD reproducing device 50.

The DVD reproducing device 50 receives the OSD request output in step S105 (S201). At the time, the DVD reproducing device 50 determines whether the selecting portion 553 has selected the DVD video signal DVS (S202). When the DVD 531 is reproduced, the selecting portion 553 has selected the DVD video signal DVS. Therefore, when the OSD request is received, the selecting portion 553 selects the input OSD signal φOS1. More specifically, the selecting portion 553 selects the analog input terminal AIT2 (S203).

In this way, the OSD signal φOS1 output in step S103 is output from the analog input terminal AIT2 to the display 200 through the selecting portion 553 and the conversion portion 56. Consequently, the OSD screen of the AV receiver 10 can be displayed at the display 200. Therefore, the user can adjust settings for the AV receiver 10 while looking at the OSD screen. Note that the OSD signal φOS1 may be output as an HDMI signal. In this case, the selecting portion 553 selects the HDMI input terminal HIT2 in step S203.

When the AV receiver 10 receives a cancellation request for the OSD from the user (S108), the OSD signal output portion 14 stops outputting the OSD signal φOS1 (S120). In this way, the OSD screen of the AV receiver 10 is no longer displayed at the display 200.

Then, the determining portion 111 determines the type of connection (S109). The determining portion 111 determines that the connection is the type 1 connection, and therefore the request portion 112 outputs an OSD cancellation request to the DVD reproducing device 50 (S110).

Upon receiving the OSD cancellation request (S204), the DVD reproducing device 50 determines whether the selecting portion 553 has switched the selection in response to the OSD request received in step S201 (S205). The memory (not shown) in the control portion 52 records that the signal selected before the switching is the DVD video signal DVS. Therefore, the selecting portion 553 again selects the DVD video signal DVS (S206). Consequently, once the OSD screen is no longer displayed at the display 200, the video is again displayed.

For Type 2 Connection

Referring to FIGS. 12 and 13, when an HDMI DVD video signal DVS is output to the display 200 through the AV receiver 10 from the DVD reproducing device 50 and the AV receiver 10 receives a request for an OSD from the user (S102), the OSD signal output portion 14 outputs an OSD signal φOS1 (S103). The determining portion 111 then determines the connection as the type 2 connection (S104).

At the time, the determining portion 111 also determines the DVD video signal DVS as an HDMI signal (S106). As a result, the selecting portion 15 selects the analog input terminal AIT1 (S107). Therefore, the HDMI DVD video signal DVS is interrupted by the selecting portion 15.

When the selecting portion 15 selects the HDMI input terminal HIT1, the AV receiver can only output the signal input from the HDMI input terminal HIT1 as it is and cannot output the OSD signal φOS1. Therefore, the selecting portion 15 selects the analog input terminal AIT1 in step S107. In other words, the HDMI DVD video signal DVS is interrupted. Therefore, the AV receiver 10 can output the OSD signal φOS1 to the display 200. Consequently, the OSD screen of the AV receiver 10 can be displayed at the display 200 and the user can adjust the settings while looking at the OSD screen.

Meanwhile, when the AV receiver 10 receives a cancellation request for the OSD from the user (S108), the OSD signal output portion 14 stops outputting the OSD signal φOS1 (S120).

The determining portion 111 then determines the connection as the type 2 connection (S109). The determining portion 111 also determines that the selected terminal before the switching is the HDMI input terminal HIT1 (S111). Therefore, the selecting portion 15 again selects the HDMI input terminal HIT1 (S112). Note that information before the switching is recorded in the memory 18. In this way, when the OSD screen is no longer displayed, the video is again displayed at the display 200.

4. Video Signal Selecting Processing

In the type 1 connection, the DVD reproducing device 50 outputs a DVD video signal DVS, the AV device 500 connected to the analog input terminal AIT1 of the AV receiver 10 outputs a video signal, or the AV device 500 connected to the HDMI input terminal HIT1 of the AV receiver 10 outputs an HDMI video signal. The video signal to be output to the display 200 is selected by the selecting portion 553 in the DVD reproducing device 50. Therefore, while the user normally requests the DVD reproducing device 50 to select a video signal, the user may request the AV receiver 10 to select a video signal.

Figure 14:
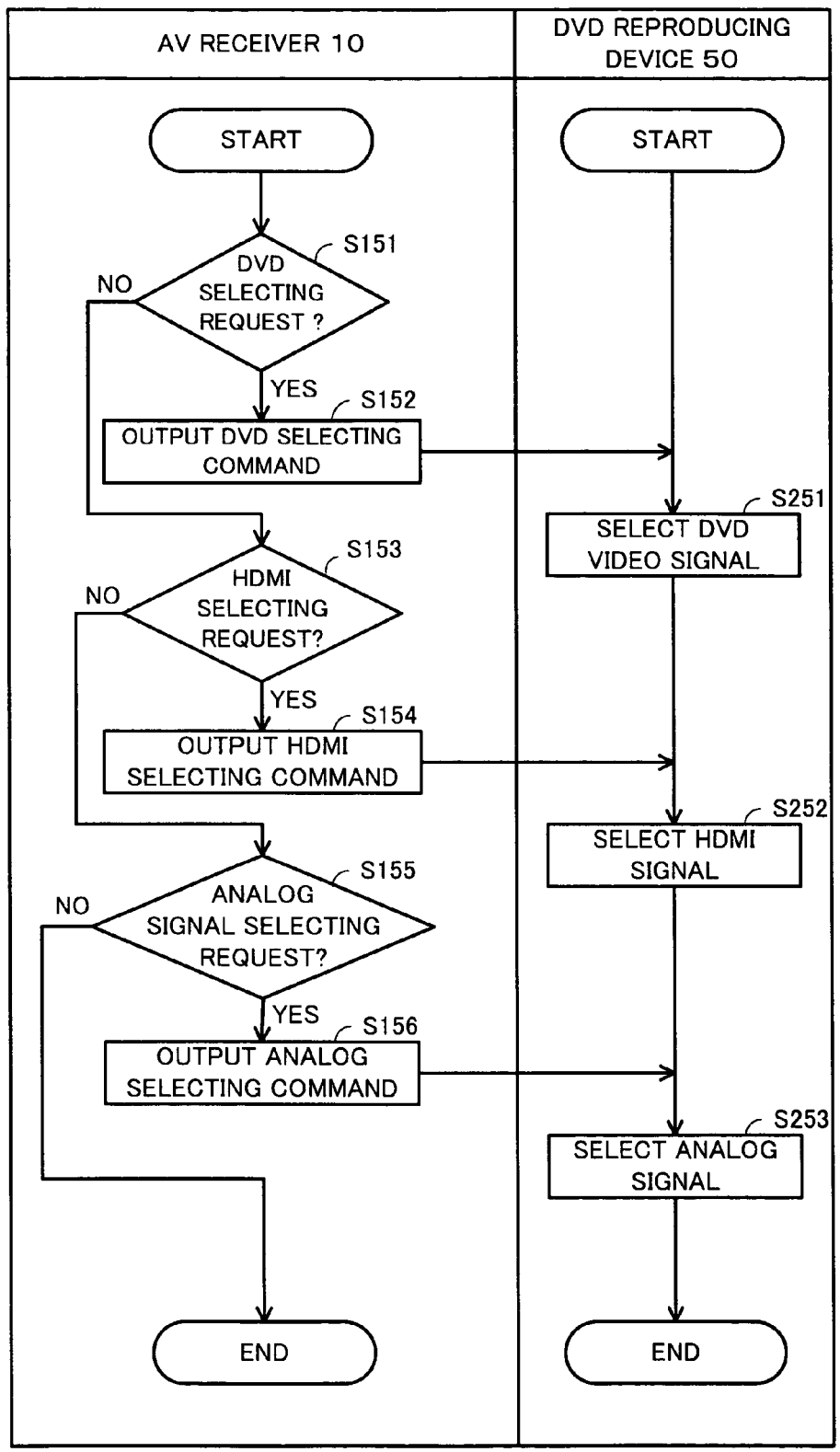
FIG. 14 is a flowchart for use in illustration of operation in video signal selecting processing in the AV system shown in FIG. 1.
Figure 15:
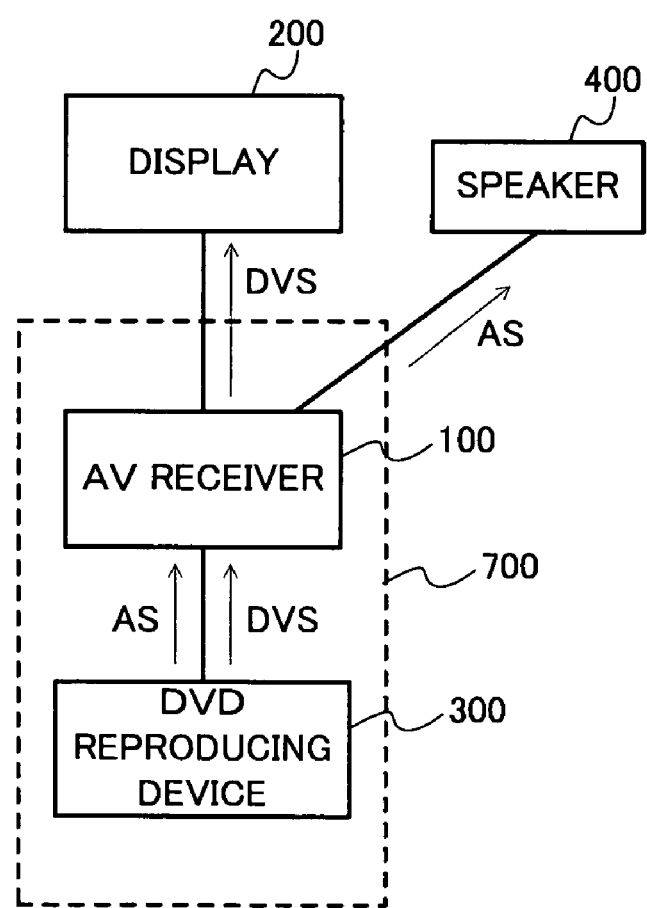
FIG. 15 is a block diagram showing a type of connection between a conventional AV system and a display.
Figure 16:
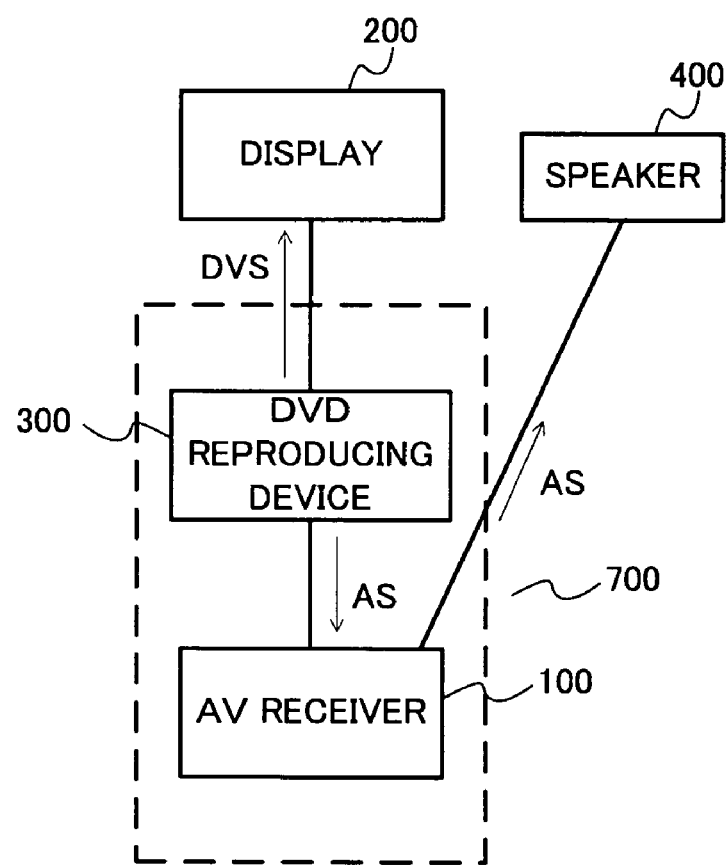
FIG. 16 is a block diagram of a modification of the type of connection shown in FIG. 15.

Referring to FIG. 14, when the user desires to watch video reproduced by the DVD reproducing device 50, the user transmits a DVD selecting request to the AV receiver 10 using a remote or the like.

At the time, the AV receiver 10 receives the DVD selecting request (S151) and the request portion 112 outputs a DVD selecting command to the DVD reproducing device 50 (S152). The DVD reproducing device 50 receives the DVD selecting command and the selecting portion 553 selects a DVD video signal DVS (S251). In this way, the user may have video based on the DVD video signal DVS displayed at the display 200 by requesting the AV receiver 10.

Similarly, upon receiving an HDMI selecting request from the user (S153), the AV receiver 10 outputs an HDMI selecting command (S154). Upon receiving the HDMI selecting command, the selecting portion 553 selects the HDMI input terminal HIT2 (S252). In this way, video based on an HDMI video signal transmitted from the AV device 500 connected to the AV receiver 10 can be displayed at the display 200. Similarly, when the AV receiver 10 receives an analog signal selecting request (S155) and the request portion 112 outputs an analog selecting command (S156), the selecting portion 553 selects the analog input terminal AIT2 (S253).

In the AV system 1 according to the embodiment, the digital video signal is the HDMI video signal, but the same operation can be carried out when the signal is a DVI video signal. For the DVI video signal, the AV receiver 10 and the DVD reproducing device 50 include a DVI input terminal and a DVI output terminal for inputting and outputting DVI video signals.

In the AV system 1 according to the embodiment, when the display 200 receives a still-picture signal and displays a still picture, the same operation as the case of the video signal can be carried out.

The present invention is similarly applicable to other amplifiers such as an AV amplifier than the AV receiver 10.

The present invention is applicable to arbitrary content reproducing devices other than the DVD reproducing device 50. The invention may be applied for example to an arbitrary recording medium reproducing device such as a DVD audio player that reproduces a still picture and audio sounds, and a client device that reproduces a content (including audio sounds, video and/or a still picture) distributed from a server through a network such as a LAN or the Internet.

The embodiment of the invention is described simply by way of illustrating the present invention. Therefore, the invention is not limited to the embodiment described above and the embodiment may be modified as required without departing from the scope of the invention.

What is claimed is:

1. An AV system comprising an amplifier and a content reproducing device and connected to a display,
    said amplifier, comprising:
    a receiver receiving an external request for an On Screen Display;
    a determiner determining the type of connection among said amplifier, said content reproducing device, and said display when said receiver receives the external request for the On Screen Display; and
    a requester transmitting an On Screen Display request for displaying settings for said amplifier at said display to said content reproducing device when said determiner determines that said amplifier is connected to said display through said content reproducing device,
    said content reproducing device comprising an On Screen Display instructor causing said display to display the settings for said amplifier upon receiving the On Screen Display request.

2. The AV system according to claim 1, wherein
    said determiner further determines whether said amplifier has received a digital video or still-picture signal from said content reproducing device, and
    said requester transmits the On Screen Display request to said content reproducing device when said determiner determines that said amplifier is connected between said display and said content reproducing device and has received the digital video or still-picture signal.

3. The AV system according to claim 1, wherein
    the On Screen Display request includes setting information for said amplifier,
    said content reproducing device comprises a producer for producing an analog video or still-picture signal or a digital video or still-picture signal, and
    said On Screen Display instructor comprises:
    a reproducing determiner determining whether said producer has produced the video signal or still-picture signal when the On Screen Display request is received;
    an On Screen Display producer producing an On Screen Display signal based on the setting information when said reproducing determiner determines that said producer has produced the video signal or still-picture signal; and
    a combiner outputting a composite signal produced by combining the On Screen Display signal and the video signal or still-picture signal to said display.

4. The AV system according to claim 3, wherein
    said requester transmits an On Screen Display cancellation request to said content reproducing device when said receiver receives an external cancellation request for the On Screen Display, and
    said On Screen Display producer stops producing the On Screen Display signal upon receiving the On Screen Display cancellation request.

5. The AV system according to claim 1, wherein
    said amplifier further comprises an On Screen Display output device outputting an On Screen Display signal for displaying settings for said amplifier at said display when said receiver receives the external request for the On Screen Display, and
    said On Screen Display instructor transmits the output On Screen Display signal to said display upon receiving the On Screen Display request.

6. The AV system according to claim 5, wherein
    said On Screen Display instructor comprises a selector selecting one of the On Screen Display signal, and the video signal or the still-picture signal to output the selected signal to said display, and
    said selector selects the On Screen Display signal upon receiving the On Screen Display request.

7. The AV system according to claim 6, wherein
    said On Screen Display output device stops outputting the On Screen Display signal, and said requester transmits an On Screen Display cancellation request to said content reproducing device when said receiver receives the external cancellation request for the On Screen Display, and
    said selector selects the video signal or still-picture signal upon receiving the On Screen Display cancellation request.

8. The AV system according to claim 5, wherein
    said determiner determines whether said amplifier has received a digital video or still-picture signal from said content reproducing device, and
    said amplifier further comprises:
    an output device outputting the received digital video or still-picture signal as it is; and
    an interrupter interrupting the digital video or still-picture signal when said determiner determines that said amplifier is connected between said display and said content reproducing device and has received the digital video or still-picture signal.

9. The AV system according to claim 8, wherein
    said On Screen Display output device stops outputting the On Screen Display signal and said interrupter cancels interruption of the digital video or still-picture signal when said receiver receives the external cancellation request for the On Screen Display.

10. An amplifier capable of connecting to a reproducing device and a display, said amplifier comprising:
    a receiver receiving an external request for an On Screen Display;
    a determiner determining a type of connection among said amplifier, said content reproducing device, and said display when said receiver receives the external request for the On Screen Display; and
    a requester transmitting an On Screen Display request for displaying settings for said amplifier at said display to said content reproducing device when said determiner determines that said amplifier is connected to said display through said content reproducing device.

11. The amplifier according to claim 10, wherein
    the On Screen Display request includes setting information for said amplifier.

12. The amplifier according to claim 10, wherein
    said determiner further determines whether said amplifier has received a digital video or still-picture signal from said content reproducing device, and
    said requester transmits the On Screen Display request to said content reproducing device when said determiner determines that said amplifier is connected between said display and said content reproducing device and has received the digital video or still-picture signal.

13. The amplifier according to claim 10 further comprising an On Screen Display output device outputting an On Screen Display signal for displaying settings for said amplifier at said display when said receiver receives the external request for the On Screen Display.

14. The amplifier according to claim 13, wherein
said determiner determines whether said amplifier has received a digital video or still-picture signal from said content reproducing device, and
said amplifier further comprises:
an output device outputting the received digital video or still-picture signal as it is; and
an interrupter interrupting the digital video or still-picture signal when said determiner determines that said amplifier is connected between said display and said content reproducing device and has received the digital video or still-picture signal.

15. A content reproducing device capable of connecting to a display and an amplifier outputting an On Screen Display signal for displaying settings for said amplifier at said display upon receipt of an external request for the On Screen Display and transmitting an On Screen Display request in response to the external request when said amplifier is connected to said display through said content reproducing device, said content reproducing device comprising:
a receiver receiving the On Screen Display signal and the On Screen Display request from said amplifier; and
an On Screen Display instructor transmitting on the On Screen Display signal to said display upon receiving the On Screen Display request and the On Screen Display signal from said amplifier.

16. A content reproducing device capable of connecting to a display and an amplifier transmitting an On Screen Display request including setting information for said amplifier, said content reproducing device comprising:
a receiver receiving the On Screen Display request from said amplifier;
a producer producing a video signal or still-picture signal;
a reproducing determiner determining whether said producer has produced the video signal or still-picture signal upon receiving the On Screen Display request;
an On Screen Display producer producing an On Screen Display signal based on the setting information when said producing determiner determines that said producer has produced the video signal or still-picture signal; and
a combiner outputting a composite signal produced by combining the On Screen Display signal and the video signal or still-picture signal to said display.

17. The content reproducing device according to claim 15, wherein
said On Screen Display instructor comprises a selector selecting one of the On Screen Display signal and the video signal or the still-picture signal to output the selected signal to said display, and
said selector selects the On Screen Display signal upon receiving the On Screen Display request.

18. A computer program stored on a computer-readable medium causing a computer in an amplifier capable of connecting to a content reproducing device and a display, to perform the steps of:
determining whether an external request for an On Screen Display has been received;
determining a type of connection among said amplifier, said content reproducing device, and said display upon determining that the external request has been received; and
transmitting an On Screen Display request for displaying settings for said amplifier at said display to said content reproducing device upon determining that said amplifier is connected to said display through said content reproducing device.

19. A computer program stored on a computer-readable medium causing a computer in a content reproducing device capable of connecting to a display and an amplifier outputting an On Screen Display signal for displaying settings for said amplifier at said display upon receipt of an external request for the On Screen Display and transmitting an On Screen Display request in response to the external request when said amplifier is connected to said display through said content reproducing device, to perform the steps of:
receiving the On Screen Display signal and the On Screen Display request from said amplifier; and
transmitting the On Screen Display signal to said display upon receiving the On Screen Display request and the On Screen Display signal from said amplifier.

* * * * *